United States Patent
Shon

(10) Patent No.: US 7,925,258 B2
(45) Date of Patent: *Apr. 12, 2011

(54) METHOD OF ROAMING IN BROADCAST SERVICE AND SYSTEM AND TERMINAL THEREOF

(75) Inventor: Min-Jung Shon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,920

(22) Filed: Jul. 7, 2010

(65) Prior Publication Data

US 2010/0273478 A1 Oct. 28, 2010

Related U.S. Application Data

(63) Continuation of application No. 11/710,948, filed on Feb. 27, 2007, now Pat. No. 7,778,638.

(60) Provisional application No. 60/776,941, filed on Feb. 28, 2006.

(30) Foreign Application Priority Data

Feb. 27, 2007 (KR) .......................... 10-2007-0019488

(51) Int. Cl.
*H04W 4/00* (2009.01)
(52) U.S. Cl. ...................................... 455/433; 455/432.1
(58) Field of Classification Search .................. 455/433, 455/432.1, 411, 436, 445, 432.3, 435.1, 466, 455/440, 442, 418–420; 370/328, 312, 331
See application file for complete search history.

(56) References Cited

U.S. PATENT DOCUMENTS

| 7,171,212 | B2 | 1/2007 | Kim et al. |
| 7,391,724 | B2 | 6/2008 | Alakoski et al. |
| 7,398,091 | B2 | 7/2008 | Chen |
| 7,565,138 | B2 | 7/2009 | Kim et al. |
| 7,778,638 | B2 * | 8/2010 | Shon .............................. 455/433 |
| 2004/0147266 | A1 | 7/2004 | Hwang et al. |
| 2006/0030312 | A1 | 2/2006 | Han et al. |
| 2006/0034215 | A1 | 2/2006 | Moon et al. |
| 2006/0223499 | A1 * | 10/2006 | Pecen et al. .................... 455/411 |
| 2006/0262751 | A1 * | 11/2006 | Vermola et al. ............... 370/331 |
| 2007/0093202 | A1 * | 4/2007 | Hwang et al. ................ 455/3.06 |
| 2007/0184833 | A1 * | 8/2007 | Xu et al. ..................... 455/432.1 |

FOREIGN PATENT DOCUMENTS

WO WO 2004/030293 A1 4/2004

* cited by examiner

*Primary Examiner* — George Eng
*Assistant Examiner* — Brandon J Miller
(74) *Attorney, Agent, or Firm* — Birch, Stewart, Kolasch & Birch, LLP

(57) ABSTRACT

A method, system, and terminal for handling or processing roaming errors between networks that can support broadcast services. When a roaming service between networks is requested, if a user authentication request is unsuccessful due to non-matching identification information between the networks, a corresponding error message is delivered to the subscriber terminal and network information that has been recently updated using various methods is provided such that repetitive requests and responses for authentication can be avoided when the subscriber requests a roaming service, and thus a roaming service between networks can be quickly provided without delays.

14 Claims, 11 Drawing Sheets

Fig.4

| 025 | Service Provider ID Unknown <br> This code indicates a confliction when the visited or Home Service Provider requests a message to the Home or Visited Service Provider. |
|---|---|
| 026 | Service Provider BSM_ID Unknown <br> This code indicates a confliction when the visited or Home Service Provider BSM requests a message to the Home or Visited Service Provider BSM. |

METHOD OF ROAMING IN BROADCAST SERVICE AND SYSTEM AND TERMINAL THEREOF

This application is a continuation of U.S. patent application Ser. No. 11/710,948 filed on Feb. 27, 2007, now U.S. Pat. No. 7,778,638 which claims the priority benefit of U.S. Provisional Application No. 60/776,941 filed on Feb. 28, 2006 and Korean Patent Application No. 10-2007-0019488 filed on Feb. 27, 2007 in Republic of Korea. The entire contents of these applications are herein fully incorporated by reference.

BACKGROUND OF THE INVENTION

1. Field of the Invention

This disclosure relates to broadcast services for wireless (mobile) communications.

2. Discussion of the Background Art

This disclosure provides a method for processing errors related to roaming between networks that support broadcast services, and a system and terminal thereof.

In general, a broadcast service (i.e., a BCAST service) refers to a service for providing over-the-air (OTA) broadcasting or various additional information via mobile terminals. The broadcast service denotes a new type of service for a mobile terminal which includes both a broadcast service by which a service provider provides all subscribers that subscribed to its services with useful information, and a multicast service which provides various information only to a certain group of subscribers having subscribed to a particular subject or content.

Current mobile communication networks provide simple services which give some limited information to subscribers. However, a BCAST service for providing a multimedia broadcast or providing various contents has yet to be fully implemented in a desirable manner.

Even if BCAST service is to be more properly implemented and provided in the near future, such service may be independently operated in each network. Accordingly, if a user has moved into an area managed by another network, a roaming service is required.

In addition, the BCAST service is intended to provide a plurality of subscribers with the same service at the same time. Also, since only users who have subscribed to a particular service provided by a service provider are able to receive that particular service, the users should have previously completed a procedure of subscribing to the particular service provided by the service provider, upon providing user information and buying their desired service.

User information is typically managed by a particular service provider, namely, a home service provider, and the corresponding service may be received only within a home network area managed by the home service provider.

Therefore, in order for the user to continuously receive a broadcast service even after moving into a visited (or visiting) network which belongs to another service area, a roaming procedure for the broadcast service should first be defined.

The related art broadcast service has been defined based on an area(s) managed by (or belonging to) a home service provider. Also, roaming techniques for broadcast services is gaining more attention in recent times. Because a broadcast service aims to provide the same content to a plurality of users, if subscriber information is checked and particular content desired to be purchased is selected at the beginning of the service subscription, then the service may be freely received.

In order for the user to receive a roaming service for which the user moves from a home network (i.e., the home service provider) into a visited network (i.e., a visited service provider), a BCAST Subscription Management (BSM) server of the home network and the BSM server of the visited network should exchange subscriber information and area information related to a service(s) which the user has bought or can buy. Also, problems which may have occurred during the above-described process should be informed precisely to the subscribers.

It is assumed that the subscriber terminal has already subscribed to a roaming service from the home network. Also, it is assumed that the subscriber terminal has identification information of the visiting network to which it will move to from the home network, whereby such identification information may include 'visited service provider ID and address' and 'visited service provider BSM server ID and address'.

In the related art, even though the 'visited service provider ID and address' or the 'visited service provider BSM server ID and address' have changed, when there is a failure in roaming service authorization (or authentication) due to improper updating or improper designation, the subscriber should undesirably repeat the request for a roaming service via his terminal, which causes delays and problems in proceeding with the roaming service.

SUMMARY OF THE INVENTION

The present inventors recognized at least the above-described shortcomings and drawbacks of the related art. Based upon such recognition, various features described hereafter have been conceived.

Accordingly, an aspect of this disclosure is to deliver a corresponding error message to the subscriber terminal if a user authorization (or authentication) request has failed due to inconsistencies in (or non-matching of) identification information between networks when inter-network roaming service is requested.

Another aspect of the disclosure is to avoid repetitive roaming service request/response procedures when the subscriber submits a roaming service request by delivering a corresponding error message to the subscriber terminal and by providing network identification information (that has been recently updated by various procedures) to the subscriber terminal, which thus allows inter-network roaming service to be promptly provided without much delays.

To achieve these aspects, this disclosure provides a broadcast roaming method comprising: receiving, by a first server from a terminal, a first message that requests a roaming service; sending, by the first server to a second server, a second message that requests authorization with respect to the roaming service; and receiving, by the first server from the second server, a third message in response to the requested authorization with respect to the roaming service.

The method may further comprise: sending, by the first server to the terminal, an authorization failure message based upon the third message.

The method may further comprise: receiving, by the first server from the second server, unique information with respect to the second server (i.e., information that is characteristic, peculiar, inherent, inborn, innate, etc. with respect to the second server); sending, from the first server to the terminal, the received unique information with respect to the second server; and updating, performed by the terminal, by using the received unique information.

The method wherein the step of receiving a third message may comprise: extracting, by the second server, first information from the second message; comparing, by the second server, the first information with second information that it already has; and if the first information and the second information do not match, sending, by the second server to the first server, the third message upon including a signal indicating a failure of the roaming service authorization.

Also, this disclosure provides a broadcast roaming error processing method performed by a source entity, the method comprising: a first step of requesting, to a target entity, a roaming service authorization with respect to a roaming service if the roaming service is requested by a terminal; and a second step of sending, to the terminal, an error message that indicates authorization failure, after receiving a response with respect to the roaming service authorization from the target entity.

The method wherein the second step may comprise: determining, by the target entity, whether first information sent by the source entity matches second information that it has; receiving, from the target entity, the error message that indicates authorization failure, if the first information and the second information do not match; and delivering the received error message to the terminal.

Additionally, this disclosure provides a broadcast roaming method comprising: requesting, by a first server to a second server, second information upon receiving, from a terminal, a roaming service request message that comprises first information; receiving, by the first server from the second server, the requested second information; determining, by the first server based on the first information and the second information, whether to authorize the service roaming request of the terminal; and sending, from the first server to the terminal, a message that indicates authorization failure, if the first server determined that the service roaming request should not be authorized.

Furthermore, this disclosure provides a terminal comprising: a transceiver that requests a roaming service to a particular entity upon including first information into a roaming service request message; a receiver that receives, from the particular entity, an error message indicating roaming service authorization failure with respect to the roaming service request, and receives second information delivered from the particular entity; a processor that updates the first information using the second information received by the receiver; and a memory that stores the updates second information.

The terminal may further comprise: a display that displays an error message corresponding to roaming service authorization failure.

Also, this disclosure provides a broadcast system comprising: a first server that sends a user authorization request with respect to a roaming service request, upon receiving the roaming service request from a terminal; and a second server that receives the roaming service authorization request of the first server, and sends, to the first server, a response message with respect to the roaming service authorization request.

BRIEF DESCRIPTION OF THE DRAWINGS

FIG. 4 is a reference diagram of an exemplary error message.

DETAILED DESCRIPTION OF THE INVENTION

The features of the present disclosure may be implemented in order to promptly receive an inter-network roaming service to thus avoid the need to repeatedly perform a request/response for authorization when a subscriber requests the roaming service, by transferring an error message to a subscriber terminal and providing recently updated network identification information (performed in various ways) in case the user authorization (or authentication) request has failed due to an inconsistency (or non-matching) of identification information between the networks when requesting the inter-network roaming service.

It is assumed that a broadcast roaming service is based on a state that a contract (or agreement) with respect to the roaming service has been made between a home network and a visited network, which will be described with reference to two examples.

Figure 1:
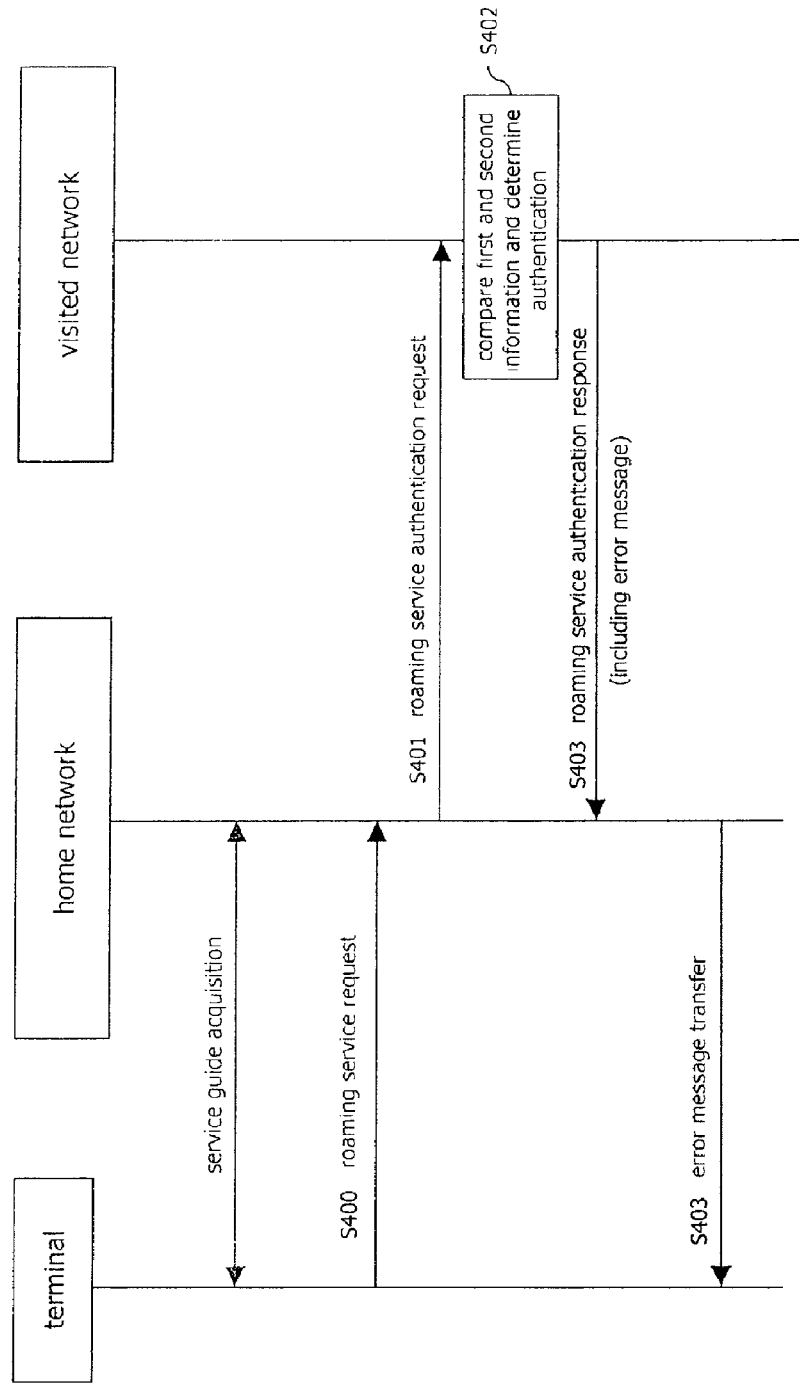
FIG. 1 is a conceptual signal diagram schematically illustrating a roaming error processing method in accordance with a first embodiment.
Figure 2:
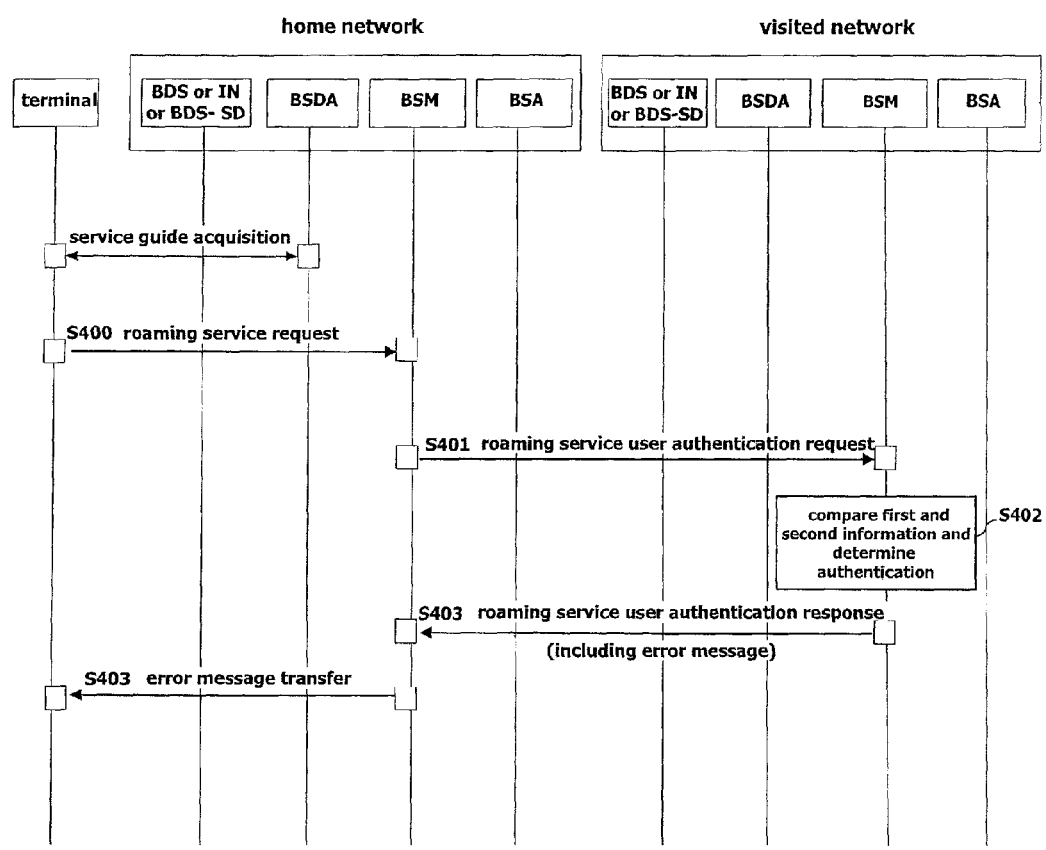
FIG. 2 is a detailed signal diagram illustrating a roaming error processing method in accordance with the first embodiment.
Figure 3:
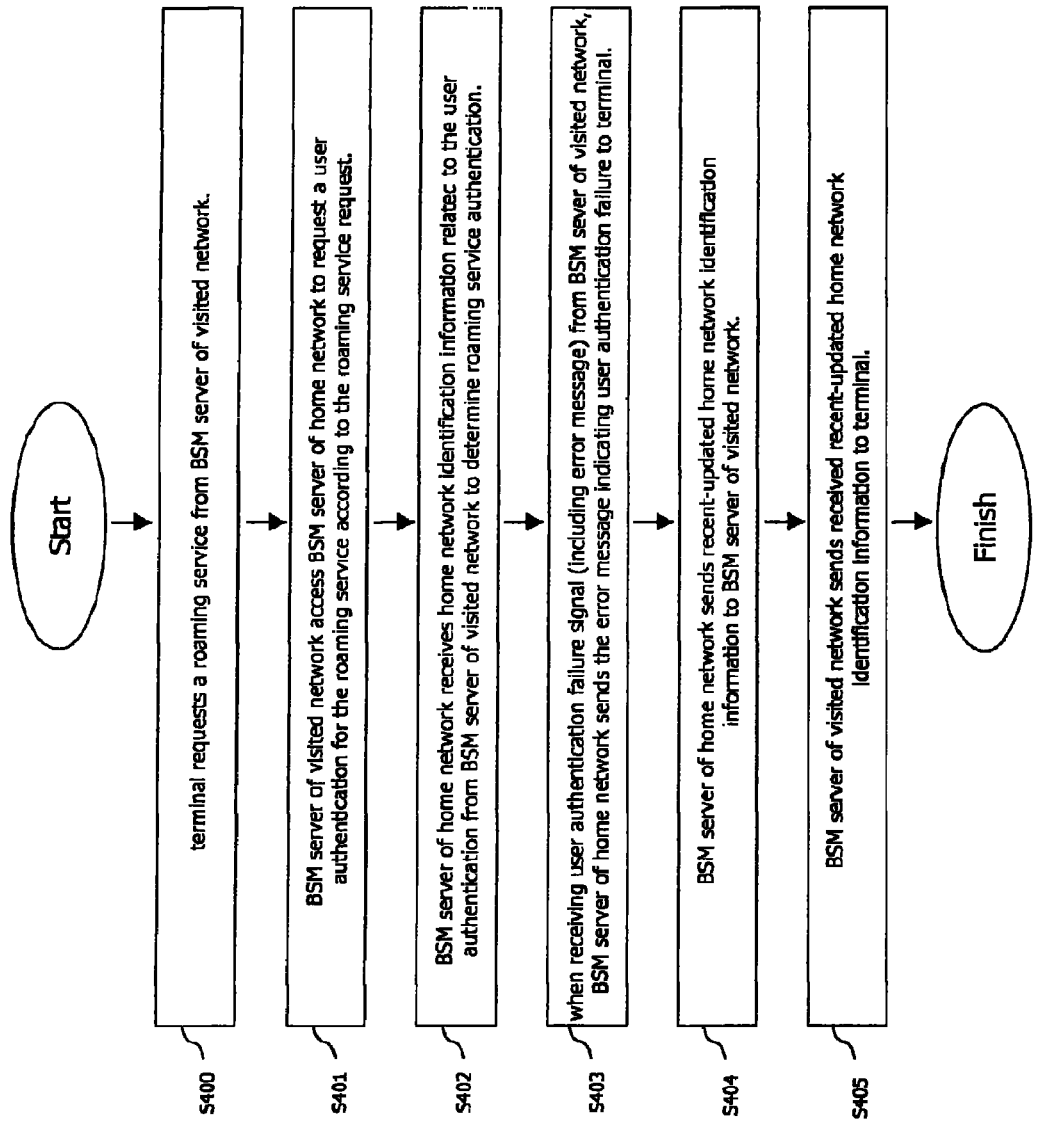
FIG. 3 is a flowchart illustrating a roaming error processing method in accordance with the first embodiment.
Figure 5:
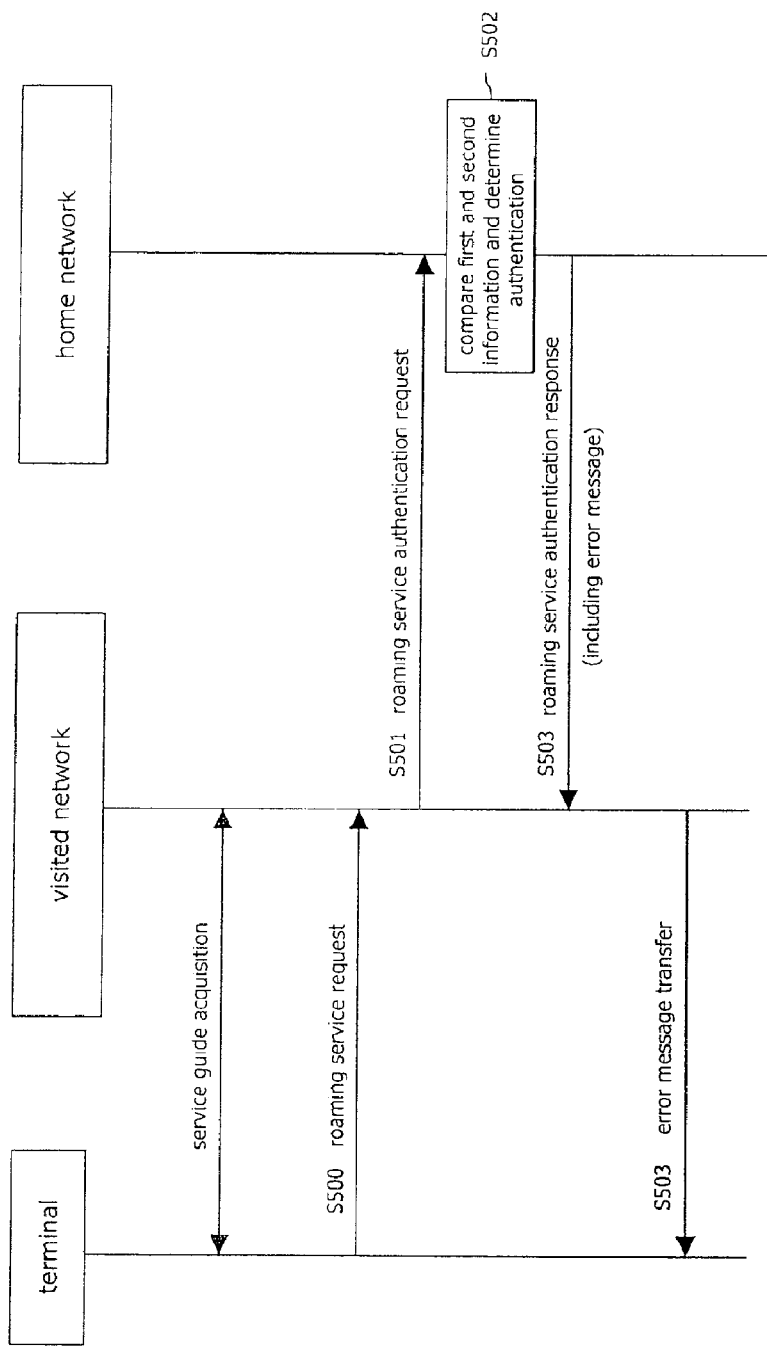
FIG. 5 is a conceptual signal diagram schematically illustrating a roaming error processing method in accordance with a second embodiment.
Figure 6:
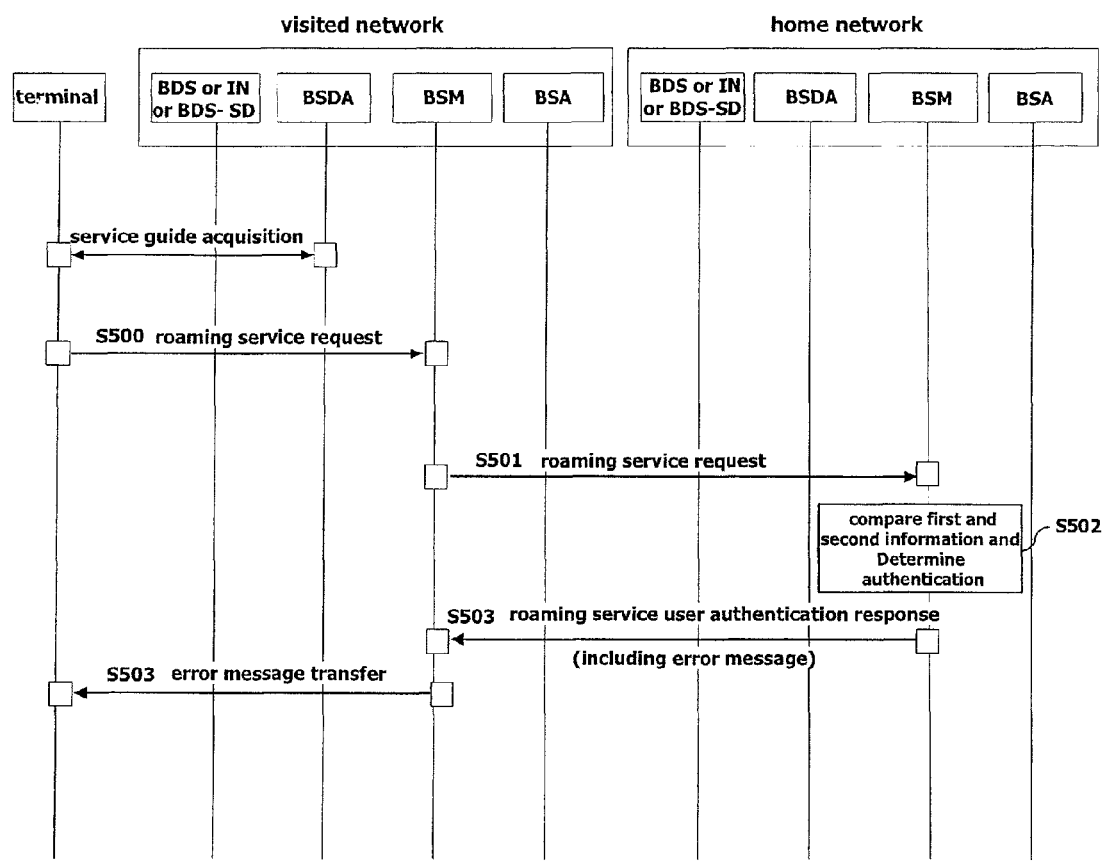
FIG. 6 is a detailed signal diagram illustrating the roaming error processing method in accordance with the second embodiment.
Figure 7:
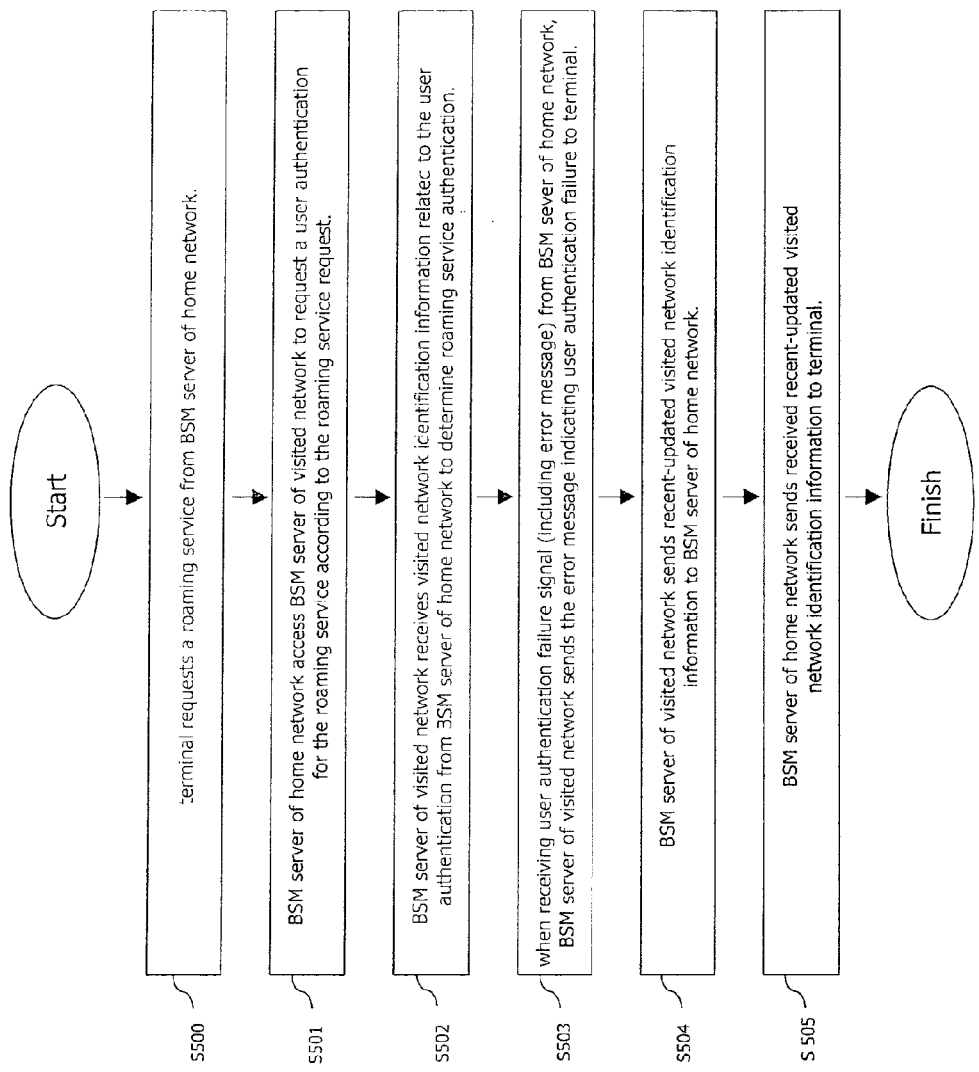
FIG. 7 is a flowchart illustrating a roaming error processing method in accordance with the second embodiment.

The exemplary embodiments may be broadly characterized and explained in two ways. FIGS. 1 through 3 are related to a first embodiment, while FIGS. 5 through 7 are related to a second embodiment.

FIGS. 1 through 3 show signal flow diagrams related to the first embodiment, whereby if the terminal is located in a home network area and performs roaming to move into a visiting network area.

Referring to FIGS. 1 through 3, the first embodiment shows a case where a subscriber's roaming service request is generated within a home network area. Here, a subscriber terminal first acquires a service guide from a BCAST Service Distribution/Adaptation (BSDA) server of the home network (i.e., a home service provider).

The service guide may be provided upon the subscriber's request or automatically provided if the subscriber terminal is located within an automatic reception area of the home network. It should be noted that the subscriber terminal may also be referred to as a User Equipment (UE), a terminal or a device.

In this state, the subscriber may request a roaming service for the visited network to which the subscriber wants to move into, from a BCAST Subscription Management (BSM) server of the home network via his terminal (S400). Here, the terminal may request the roaming service using a particular message, such as a so-called roaming service request message. Also, the roaming service request message may be comprised of identification information of the home network BSM server, identification information of the visited network BSM server, and the like. Here, the identification information may also be referred to as 'unique information' hereafter. Also, the identification information may include, for example, a home network BSM server ID and address or a visited network BSM server ID and address, or a terminal or user ID and service guide related information may also be additionally included therein.

Accordingly, the BSM server of the home network accesses the BSM server of the visited network to request a user authorization for the roaming service (S401). Here, the message corresponding to the user authorization request for the roaming service may be comprised of identification information of the home network BSM server and identification information of the visited network BSM server.

After receiving the user authorization request, the BSM server of the visited network receives, from the BSM server of the home network, visited network identification information related to the user authorization for the roaming service, namely, existing information (i.e., ID and address of a visited service provider and ID and address of a visited service provider BSM), thus to determine whether the roaming service is successfully authorized (or authenticated) (S402).

Here, the BSM server of the visited network compares the visited network identification information (or unique information) received from the BSM server of the home network with its visited network identification information. If the information does not match with each other, the BSM server of the visited network sends a signal indicating a user authorization failure to the BSM server of the home network. Here, the signal indicating user authorization failure may be expressed by using a particular code (e.g., a so-called global status code). Also, such particular code may comprise a particular element that indicates a roaming authorization status, and such particular element may be included into a response message with respect to the roaming service authorization request that the visited network BSM server sends to the home network BSM server. If in step S402 it is determined that user authorization for the roaming service has not been performed by the visited network BSM server (i.e., if a roaming service authorization failure occurs), an error message (or signal, code, etc.) indicating the roaming service authorization failure may be included in the response message. Here, the error message of FIG. 4 may refer to a value among the global status codes (e.g., global status code 025 or global status code 026), and such error message may be included in a particular element (e.g., a so-called roaming authorization status element) within the response message.

When receiving the signal indicating the user authorization failure from the BSM server of the visited network, the BSM server of the home network sends a message indicating the user authorization failure to the terminal (S403).

Afterwards, as a result of performing steps S400 through S403, if authorization with respect to the roaming service for the terminal is not allowed and thus fails, the BSM server of the visited network sends recent-updated visited network identification information it has to the BSM server of the home network (S404).

Accordingly, the BSM server of the home network then sends the received recent-updated visited network identification information to the terminal (S405). Also, the terminal may use the recently updated visited network identification information (that was delivered to the terminal) in order to update its previous corresponding identification information.

As described above, when the user checks the error message indicating a failure of the roaming service authorization via his terminal, the authorization failure with respect to the roaming service can be verified. Also, the subscriber terminal need not repeatedly perform roaming service request procedures, and need not wait for a response with respect to such request. Also, the subscriber can rapidly acquire the recently updated visited network identification information (unique information).

Meanwhile, the visited network identification information may be acquired by the following method or by using other available methods.

In order to solve the user authorization failure of the roaming service, at least two types of methods may be provided; namely, a method for updating an existing service guide including the visited network identification information and a method of terminal provisioning using a Device Management (DM) enabler (or a similar entity).

First, some exemplary methods for updating the existing service guide are as follows.

In a first method, a BSDA server of the home network sends a message indicating the user authorization failure to the terminal and provides the terminal with a service guide, which includes recently updated visited network identification information, namely, updated information (i.e., the ID and address of the visited service provider and ID and address of the visited service provider BSM).

In a second method, the BSDA server of the home network periodically provides the terminal with a service guide including the recently updated visited network identification information. Here, the BSDA server of the home network simultaneously provides the recently updated visited network identification information to all subscriber terminals in a broadcast manner.

In a third method, the BSDA server of the home network may bi-directionally provide the recently updated visited network identification information according to a one-to-one request of each terminal. Here, a method of updating each fragment of the service guide related to a roaming part may be the most efficient and effective, by which a network load can be prevented (or at least minimized).

Next, the terminal provisioning method using Device Management (DM) enabler (or similar entity) will be described hereafter.

The home network may further have a DM server (or some other appropriate network entity) so as to solve the problems of user authorization failure for the roaming service of the terminal according to the terminal provisioning method described previously.

That is, the terminal provisioning method can be considered as a one-to-one management method, which aims to perform troubleshooting. When a particular element has a problem, the problem of the corresponding element is solved by an OTA (over-the-air) scheme. Here, each subscriber can be individually managed, and thus overall management can be performed more efficiently.

FIGS. 5 through 7 refer to a second exemplary embodiment, showing a schematic signal flow diagram that illustrates the generation of an error message when a terminal located in a visited network area is roaming to move into a home network area.

Referring to FIGS. 5 through 7, the second embodiment relates to a subscriber's roaming service request being generated within a visited network area. First, the subscriber terminal acquires a service guide (or some other appropriated listing of services) from a BSDA server of the visited network (i.e., a visited service provider).

Here, the service guide may be provided by the subscriber's request or automatically provided if the subscriber terminal is located within an automatic reception area of the visited network.

In order to continuously receive a service that was being received in the (previous) home network, the subscriber terminal requests a roaming service to the visited network (S500). Here, in order for the terminal to request a roaming service to the visited network, a so-called roaming service request message may be sent. Such roaming service request message may indicate a message to request data including some constraints among pre-described constraints (or policy) between home network and visited network, especially the some constraints necessary for a roaming service to the visited network and such roaming service request message may be comprised of identification information of the home network (such as, a home network BSM server ID, a unique ID of the terminal or user, etc.), which the terminal has had and delivered to the visited network. Such identification information may also be referred to as 'unique (i.e., characteristic, peculiar, inherent, etc.) information' hereafter. Such identification information may also comprise a home network BSM server ID and address, a visited network BSM server ID and address, etc. Also, a terminal or user ID and service guide related information may be included together therein.

Accordingly, the BSM server of the visited network accesses the BSM server of the home network to request a user authorization for the roaming service (S501). Here, the roaming service authorization message may include home network BSM server identification information, visited network BSM server identification information, etc. In other words, the roaming service authorization message may include a home network BSM server ID and a visited network BSM server ID, which it currently has, received from the terminal, and if necessary, the ID of the terminal or terminal user, as well as information related to the service guide may also be included.

After receiving the user authorization request, the home network BSM server uses the information delivered from the visited network BSM server to thus determine whether the roaming service would be possible and should be authorized (or authenticated) (S502).

Here, the BSM server of the home network compares the home network identification information (e.g., home network BSM server ID) received from the visited network BSM server with the home network identification information that it already has. If the information match each other, a roaming service will be processed. On the contrary, if the information do not match each other, a signal (or some other type of messaging) indicating a user authorization failure is delivered to the visited network BSM server (S503). Here, the signal (or other types of information or message) indicating user authorization failure may be expressed by using a particular code (e.g., a so-called global status code), as shown in FIG. 4. Also, as shown in FIG. 4, the signal indicating roaming service authorization failure may be a code indicating that the service provider ID cannot be known (i.e., Service Provider ID Unknown in FIG. 4). Another example may be a code indicating that the service provider BSM server ID cannot be known (i.e., Service Provider BSM ID Unknown).

Such particular code may be included in a particular element that indicates a roaming authorization status, and such particular element may be included in a response message with respect to a roaming service authorization request that the visited network BSM server sends to the home network BSM server. In step (S502), if the visited network BSM server determines that user authorization for the roaming service is not possible (i.e., if subscriber authorization with respect to the roaming service has failed), the response message may include an error message (or error signal, error code, etc.) indicating roaming service authorization failure, as shown in FIG. 4. Here, the error message (as in FIG. 4) may correspond to one value among the global authorization codes (e.g., global status code 025 or 026), and such error message may be included within a particular element. (e.g., a so-called roaming authorization status element) in the response message. As an example, the particular element (i.e., the so-called roaming authorization status element) may be comprised of a total of 27 status codes (e.g., 000 through 026), namely, global status codes.

Upon receiving a signal (or messaging) indicating user authorization failure from the home network BSM server, the visited network BSM server sends a message (or signaling) indicating the user authorization failure to the terminal (S503). Here, the error message of step S503 may be like that as shown in FIG. 4, or may be a message indicating authorization failure that corresponds to the error message of FIG. 4.

Thus, when the user checks the error message indicating a failure of the roaming service authorization via his terminal, the authorization failure with respect to the roaming service can be verified. Also, the subscriber terminal need not repeatedly perform roaming service request procedures, and need not wait for a response with respect to such request.

Therefore, because the subscriber can check the error message via his terminal and can avoid performing any repeated roaming service request and/or response procedures, the updated home network identification information is received or another updating method is considered.

Afterwards, upon performing steps S500 through 5503, if the authorization with respect to the roaming service of the terminal is not allowed and fails, the BSM server of the home network sends recently updated home network identification information that it has to the visited network BSM server and the terminal receives the updated home network identification information to thusly success a roaming service by using it when the terminal will request a roaming service to a visited network (S504).

Accordingly, the BSM server of the visited network then sends (delivers) the received recently updated home network identification information to the terminal (S505). Also, the terminal may use the recently updated visited network identification information (that was delivered to the terminal) in order to update its previous corresponding identification information.

In order to solve the user authorization failures of the roaming service, a method for updating an existing service guide including the home network identification information and a terminal provisioning method using a Device Management (DM) Enabler (or some other appropriate Device Management (DM) entity) may be used.

First, some exemplary methods for updating the existing service guide will now be described.

In a first exemplary method, a BSDA server (or some other appropriate network entity) of the visited network sends a message (or other signaling) indicating the user authorization failure to the terminal and provides the terminal with a service guide (or some other listing of services) which includes recently updated home network identification information, namely, updated information (i.e., ID and the address of the home service provider and ID and the address of the home network provider BSM).

In a second exemplary method, the BSDA server (or some other appropriate network entity) of the visited network periodically provides the terminal with the service guide (or some other listing of services) including the recent-updated visited network identification information. Here, the BSDA server of the visited network simultaneously provides the recently updated home network identification information to all subscribed terminals in a broadcast manner.

In a third exemplary method, the BSDA server (or some other appropriate network entity) of the visited network may bi-directionally provide the recently updated home network identification information according to a one-to-one request of each terminal. Here, a method in which a roaming portion is updated by each fragment of the service guide results in improved efficiency and a network load can be minimized.

Next, the terminal provisioning method using a Device Management (DM) Enabler (or some similar entity) will be described.

The visited network may further have a DM server (or some other appropriate network entity) so as to address (and solve) the aforementioned issue of possible user authorization failure of the roaming service of the terminal by using the terminal provisioning method.

The terminal provisioning method may be the same as that shown in the first exemplary embodiment, and thus a detailed explanation thereof will not be repeated for the sake of brevity.

Hereafter, the third and fourth exemplary embodiments will be explained with reference to the drawings.

Figure 8:
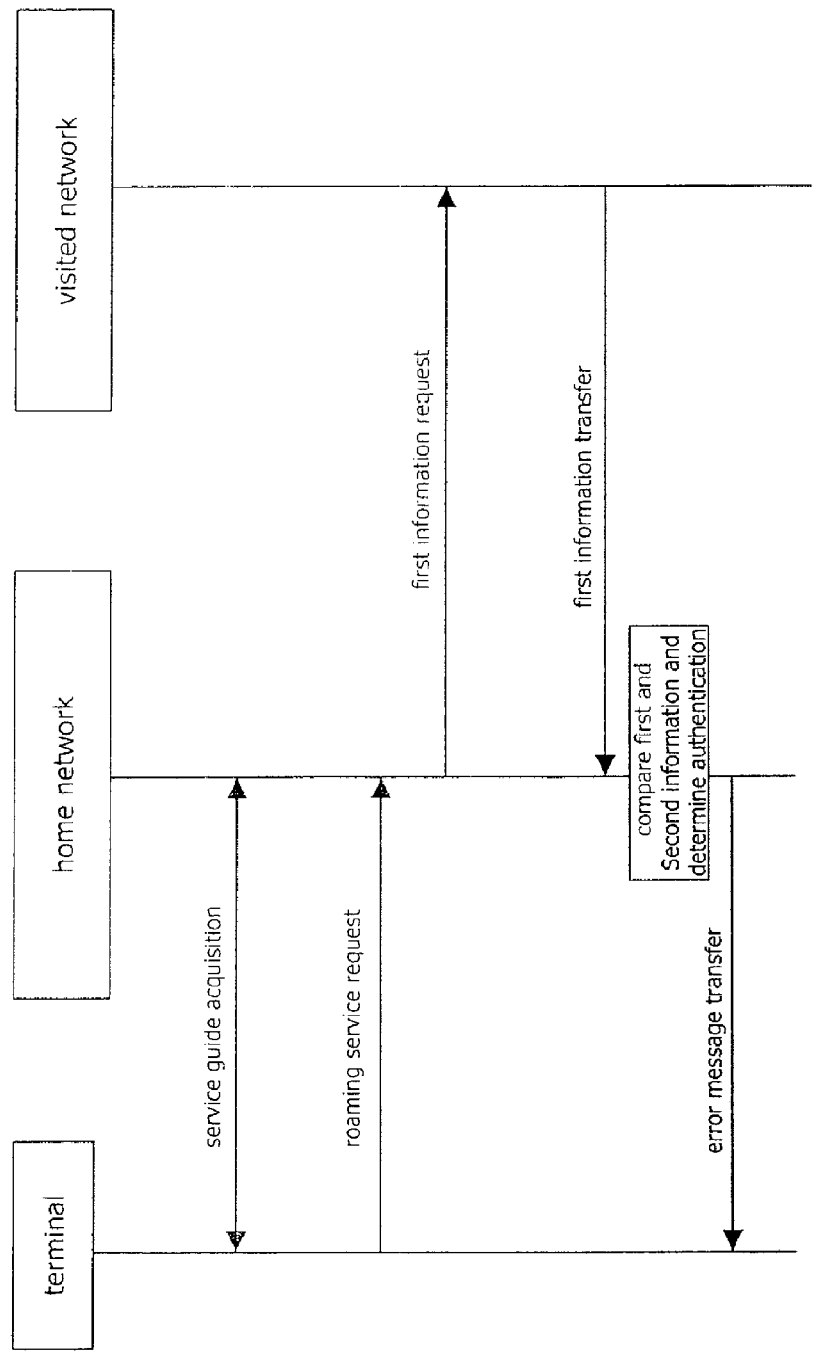
FIG. 8 is a conceptual signal diagram schematically illustrating a roaming error processing method in accordance with a third embodiment.
Figure 9:
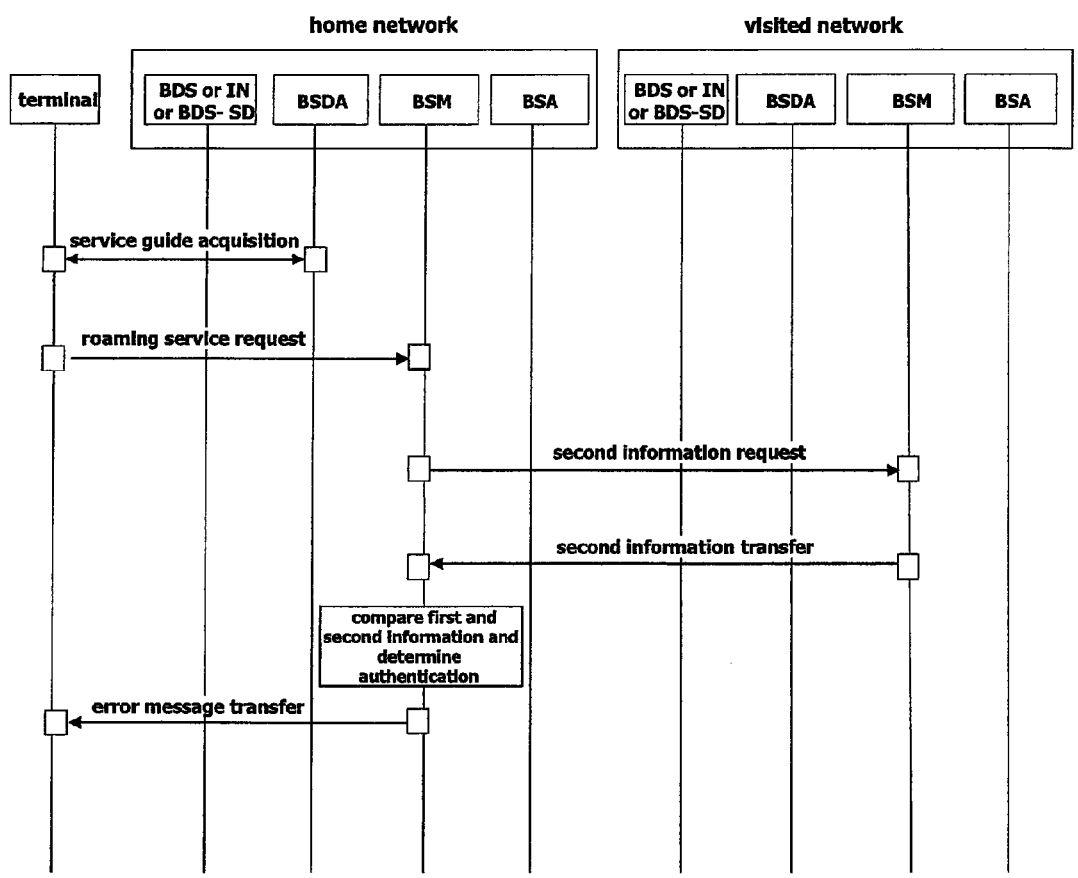
FIG. 9 is a detailed signal diagram illustrating a roaming error processing method in accordance with the third embodiment.

FIGS. 8 and 9 relate to a third exemplary embodiment and show a schematic signal flow diagram for the generation of an error message due to roaming service authorization failure when roaming service to a home network is requested by a terminal located in a home network area is to move into a visited network area.

During the step of comparing identification information between networks in the roaming error processing method, the BSM server (or other network entity) of the home network may request visited network identification information (e.g., visited network service provider ID and address, visited service provider BSM ID and address, etc.) from the BSM server (or other network entity) of the visited network. The BSM server of the home network then receives recently updated visited network identification information from the BSM server of the visited network to compare it with the visited network identification information that it already has, to thus determine whether or not the compared information match each other. The other processes may be the same as those in the first exemplary embodiment described previously.

Figure 10:
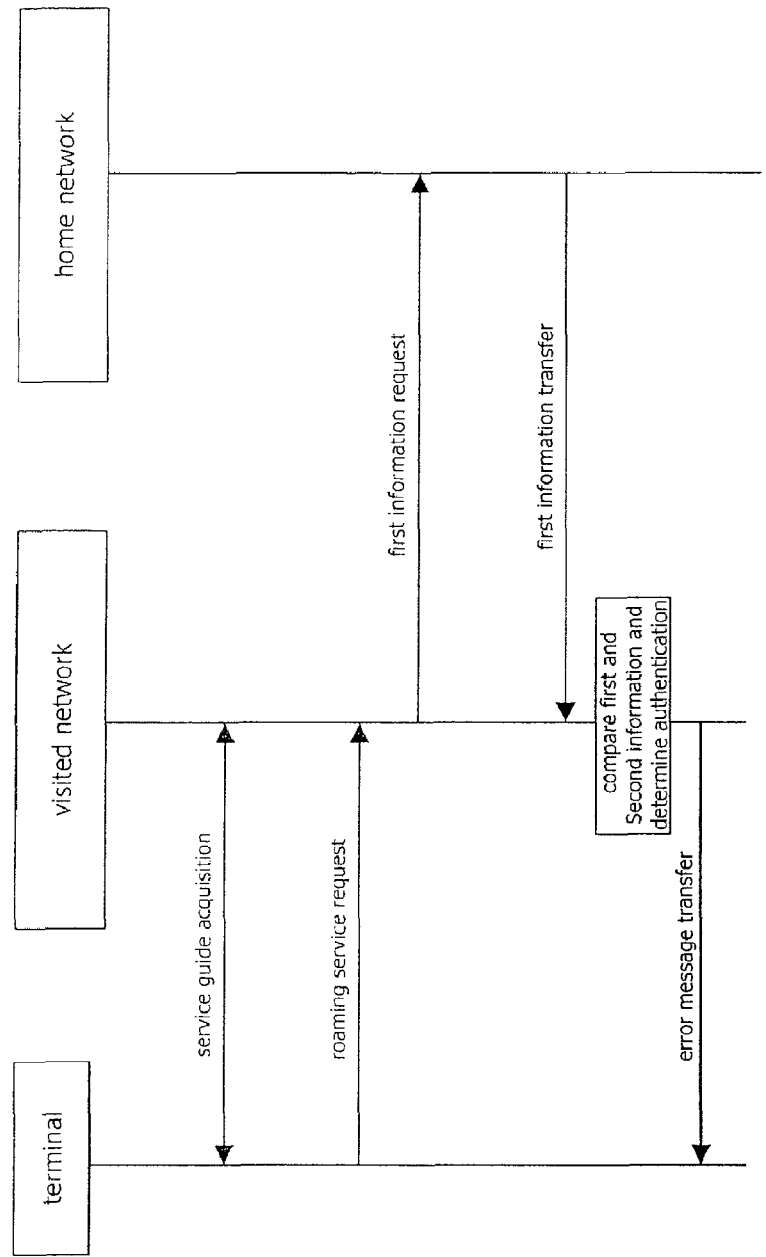
FIG. 10 is a conceptual signal diagram schematically illustrating a roaming error processing method in accordance with a fourth embodiment.
Figure 11:
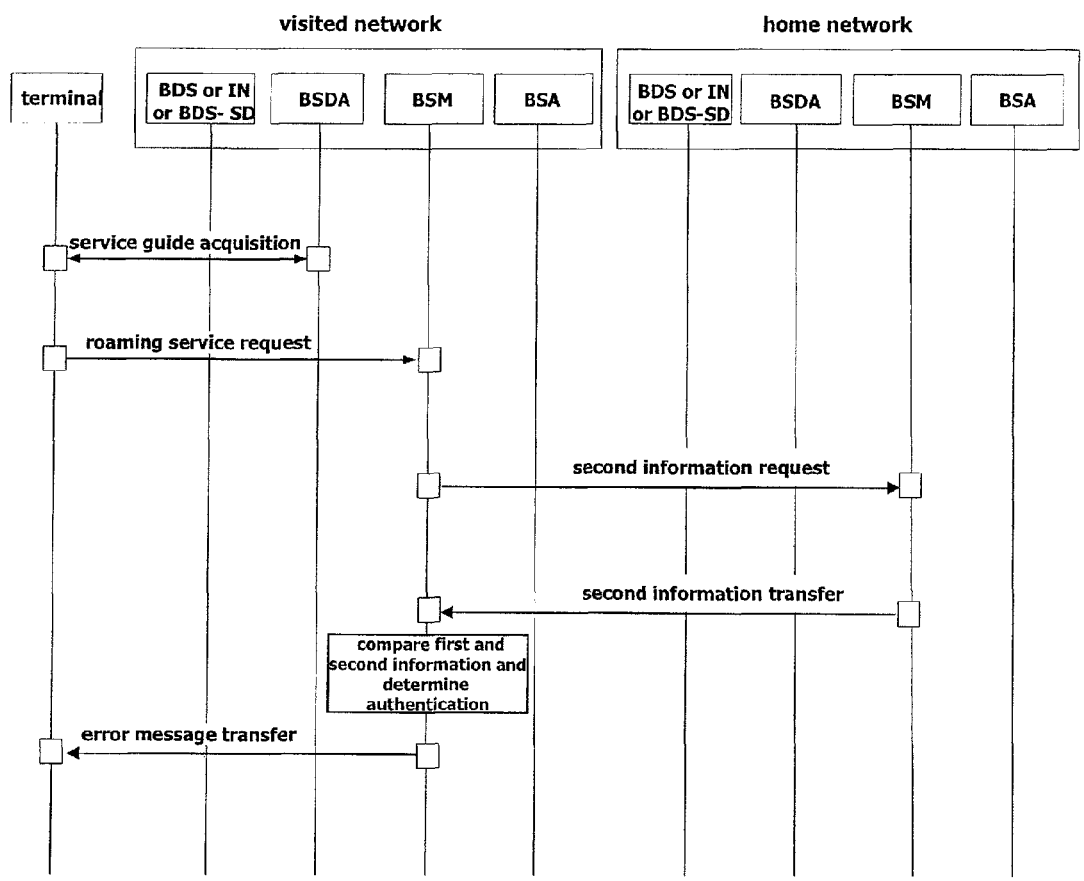
FIG. 11 is a detailed signal diagram illustrating a roaming error processing method in accordance with the fourth embodiment.

FIGS. 10 and 11 relate to a fourth exemplary embodiment and show a schematic signal flow diagram for the generation of an error message due to roaming service authorization failure when roaming service is requested for a terminal located in a home network area is to move into a visited network area.

During the step of comparing identification information between networks in the roaming error processing method, the BSM server (or some other network entity) of the visited network requests home network identification information (e.g., visited network service provider ID and address, visited service provider BSM ID and address, etc.) from the BSM server (or some other network entity) of the home network. The BSM server of the visited network then receives recently-updated home network identification information from the BSM server of the home network to compare it with the home network identification information it has, to thus determine whether or not both types of information match with each other. The other processes may be the same as those in the second exemplary embodiment described previously.

Hereafter, a terminal and broadcast system for processing roaming errors will be explained. A terminal described herein is a broad term that may refers to various types of wired and/or wireless terminals or devices that support and are applicable to broadcast services. Thus, a terminal according to this disclosure includes all devices that can support broadcast services, such as mobile communication terminals (e.g., cellular phones, PDA phones, DMB phone, mobile handsets, etc.), PDAs, notebook computers, personal computers, household appliances, consumer electronics, and the like.

An exemplary terminal according to this disclosure may be comprised of a transceiver that requests (or asks for) a roaming service to a particular entity (e.g., a visited network BSM server, a home network BSM server, etc.) upon including first information into a roaming service request message; a receiver that receives a service guide from a BSDA of a home network or a visited network, and a message (e.g., an error message) indicating roaming service authorization failure with respect to the roaming service request in accordance with a response message for user authorization for the roaming service; a processor that updates the recently updated visited network BSM server identification information (e.g., visited network BSM server ID, etc.) received by the receiver or updates the recently updated home network BSM server identification information (e.g., home network BSM server ID, etc.) received by the receiver; and a memory that stores the updated visited network BSM server identification information or the recently updated home network BSM server identification information.

Also, the receiver of the terminal may receive the visited network BSM server identification information (e.g., visited network BSM server ID, etc.) or the home network BSM server identification information (e.g., home network BSM server ID, etc.).

Also, the terminal may further comprise an output unit that provides an error message corresponding to roaming service authorization failure. Such output unit may be a display (screen) that shows the error message as text (or graphics, images, etc.), or a sound output device (e.g., a speaker unit) that outputs the error message as sounds, or a mechanical output device (e.g., a vibrating unit) that outputs the error message as vibrations, or any combination of the above. In other words, the output unit according to the features of this disclosure may provide visual, audible, and/or tactile feedback to the user.

Also, regarding the specific operations of the terminal, the matters explained with respect to the first through fourth embodiments are applicable.

Meanwhile, in addition to the elements and features explained thus far, the terminal according to the present disclosure also includes hardware and/or software needed for properly supporting and handling broadcast services. Although a detailed description about some of these basic features have not been explained, those skilled in the art can clearly understand that such features are also implemented in the terminal according to the present disclosure, and their explanation has been omitted herewith merely for the sake of brevity and to prevent the inventive features herein from being obscured.

Hereafter, regarding an exemplary broadcast system for processing roaming errors according to this disclosure will be described. Such broadcast system may be comprised of a first server that receives a roaming service request from the terminal and sends a user authorization request with respect to the roaming service request, and a second server that receives the roaming service authorization request of the first server and sends to the first server a response message with respect to the roaming service authorization request.

Here, the first server may be a visited network BSM server and the second server may be a home network BSM server. In contrast, the first server may be a home network BSM server and the second server may be a visited network BSM server.

Also, when the terminal requests a roaming service, the first server receives, from the terminal, identification information of the second server (e.g., a BSM Filter Code, etc.). Additionally, the first server sends its identification information to the second server together with the identification information of the second server received from the terminal. Here, such identification information may be the same as that of the first through fourth exemplary embodiments.

The second server compares its own identification information with the second server identification information that was sent by the first server to see if they are the same. Thereafter, if the identification information does not match, the second server determined that the authorization for the roaming service request from the terminal is not possible. Namely, this is a case of a failure in the roaming service request authorization. Thus, the second server sends to the first server, an error message indicating the user authorization failure for the roaming service. Here, the error message may be that which was already explained with reference to FIG. 4. Also, such error message may be included in the response message, sent by the second server to the first server, with respect to the roaming service authorization request.

Additionally, the second server may deliver the error message to the terminal.

Meanwhile, upon receiving a roaming service request from the terminal, the first server requests the second server to deliver the identification information that the second server has. After receiving the identification information that the second server has (i.e., the second server identification information), the first server compares to see if such is the same as the second server identification information sent by the terminal. If such information (i.e., the second server identification information that the terminal and second server respectively have) do not match, the first server determines that the roaming service request from the terminal cannot be authorized and sends an error message to the terminal.

Also, regarding the operation of the first and second servers of the broadcast system, the previous explanations corresponding to the first through fourth exemplary embodiments may be all applicable.

As aforementioned, the present features have been explained with reference to some exemplary embodiments shown in the accompanying drawings. However, these embodiments are merely exemplary. It will also be apparent to those skilled in the art that various modifications and variations can be made without departing from the scope thereof.

As described above, features of the present disclosure can be implemented such that a roaming service between networks can be rapidly received to thus enable avoidance of repeated request and/or response procedures when a subscriber requests the roaming service. This may be achieved by transferring an error message to a subscriber terminal and providing recent-updated network identification information in various manners in case where a user authorization request has been failed due to inconsistency in identification information between the networks when requesting the roaming service therebetween.

The invention claimed is:

1. A first broadcast subscription management (BSM) entity configured to communicate with a terminal via a network, comprising:
   a receiver;
   a transmitter; and
   a processor connected to the receiver and transmitter, the processor configured to:
      receive, from the terminal, a service request message, wherein the service request message comprises first information related to a second BSM entity, and wherein the service request message further comprises at least one of a user identification and a device identification,
      send, to the second BSM entity based on the first information related to the second BSM entity included in the service request message, a roaming service request message including second information about the second BSM entity, and the user identification, the second information including service provider information,
      receive, from the second BSM entity, a roaming service response message including a global status code in response to the roaming service request message, wherein if the roaming service fails, the global status code indicates that a service provider identification having been provided to the second BSM entity is unknown, that a BSM identification having been provided to the second BSM entity is unknown, or that an authorization of the device or the user failed, and
      send, to the terminal, a response message in response to the service request message, the response message including the global status code.

2. The first BSM entity of claim 1, wherein the first BSM entity is a home BSM entity and the second BSM entity is a visited BSM entity.

3. The first BSM entity of claim 1, wherein the first BSM entity is a visited BSM entity and the second BSM entity is a home BSM entity.

4. The first BSM entity of claim 1, wherein the processor is further configured to:
   receive, from the second BSM entity, updated information about the second BSM entity, and
   send, to the terminal, the updated information about the second BSM entity.

5. The first BSM entity of claim 3, wherein the processor is further configured to provide service guide information to the terminal.

6. The first BSM entity of claim 1, wherein the first or second information about the second BSM includes at least one of the service provider identification, the BSM identification, an address of a service provider and an address of the second BSM entity.

7. The first BSM entity of claim 1, wherein the service request message further comprises information about the first BSM entity.

8. The first BSM entity of claim 7, wherein the information about the first BSM comprises:
   a service provider identification, a BSM identification, an address of a service provider and an address of the first BSM entity.

9. A second broadcast subscription management (BSM) entity configured to communicate with a terminal via a first BSM entity, the terminal configured to send a service request message to the first BSM entity that includes first information related to the second BSM entity, and at least one of an user identification and a device identification, the second BSM entity comprising:
   a receiver;
   a transmitter; and
   a processor operatively connected to the receiver and transmitter, the processor configured to:

receive, from the first BSM entity, a roaming service request message including first information about the second BSM entity, and the user identification, the first information including service provider information, and send, to the first BSM entity, a roaming service response message including a global status code in response to the roaming service request message, wherein if the roaming service fails, the global status code indicates that a service provider identification having been received is unknown, that a BSM identification having been received is unknown, or that an authorization of the device or the user failed.

10. The second BSM entity of claim 9, wherein the first BSM entity is a home BSM entity and the second BSM entity is a visited BSM entity.

11. The second BSM entity of claim 9, wherein the first BSM entity is a visited BSM entity and the second BSM entity is a home BSM entity.

12. The second BSM entity of claim 9, wherein the processor is further configured to:

extract the first information from the roaming service request message; and, and compare the first information with second information that the processor already has, wherein if the first information and the second information do not match, the global status of the roaming service response message indicates a failure of the roaming service.

13. The second BSM entity of claim 9, wherein the processor is further configured to:

send, to the first BSM entity, updated information about the second BSM entity for forwarding to the terminal.

14. The second BSM entity of claim 9, wherein the first or second information about the second BSM includes at least one of the service provider identification, the BSM identification, an address of a service provider and an address of the second BSM entity.

* * * * *